(12) United States Patent
Kennedy

(10) Patent No.: US 9,945,287 B2
(45) Date of Patent: Apr. 17, 2018

(54) ASYMMETRIC ACTUATOR PIVOT SHAFT BUSHING FOR VTG TURBOCHARGER

(71) Applicant: BorgWarner Inc., Auburn Hills, MI (US)

(72) Inventor: Donald Michael Kennedy, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 251 days.

(21) Appl. No.: 14/654,000

(22) PCT Filed: Dec. 5, 2013

(86) PCT No.: PCT/US2013/073229
§ 371 (c)(1),
(2) Date: Jun. 19, 2015

(87) PCT Pub. No.: WO2014/105378
PCT Pub. Date: Jul. 3, 2014

(65) Prior Publication Data
US 2015/0315964 A1 Nov. 5, 2015

Related U.S. Application Data

(60) Provisional application No. 61/746,683, filed on Dec. 28, 2012.

(51) Int. Cl.
*F01D 17/16* (2006.01)
*F02B 37/24* (2006.01)

(52) U.S. Cl.
CPC .............. *F02B 37/24* (2013.01); *F01D 17/16* (2013.01); *F01D 17/165* (2013.01); *F05D 2220/40* (2013.01); *Y02T 10/144* (2013.01)

(58) Field of Classification Search
CPC ........ F01D 17/16; F01D 17/165; F02B 37/24; F05D 2220/40; Y02T 10/144
See application file for complete search history.

(56) References Cited

U.S. PATENT DOCUMENTS 5,146,752 A * 9/1992 Bruestle ................ F01D 17/105
415/164
6,210,106 B1 * 4/2001 Hawkins ................ F01D 11/00
415/160

(Continued)

FOREIGN PATENT DOCUMENTS

WO 2011143079 11/2011
WO 2011149867 12/2011

*Primary Examiner* — Igor Kershteyn
(74) *Attorney, Agent, or Firm* — Young Basile Hanlon & MacFarlane, P.C.

(57) ABSTRACT

A turbocharger (10) includes a housing (12, 14, 16) and an actuating mechanism (46) for actuating a device (40) within the housing (12, 14, 16). A pivot shaft (42) has an inside end (48) inside the housing (12, 14, 16) and an outside end (82) outside the housing (12, 14, 16). The pivot shaft (42) is rotatably mounted in a bore (64) in the housing (12, 14, 16) for transmitting an actuating movement from outside the housing (12, 14, 16) to the actuating mechanism (46). A bushing (62) is disposed in the bore (64). The bushing (62) includes an asymmetric portion (68) that extends inside the housing (12, 14, 16) to support the inside end (48) of the pivot shaft (42).

15 Claims, 5 Drawing Sheets

(56) References Cited

U.S. PATENT DOCUMENTS

| | | | | |
|---|---|---|---|---|
| 6,527,508 | B2* | 3/2003 | Groskreutz | F01D 17/165 415/150 |
| 6,699,010 | B2* | 3/2004 | Jinnai | F01D 17/16 29/889.22 |
| 6,951,450 | B1* | 10/2005 | Figura | F01D 9/026 415/164 |
| 2004/0109761 | A1 | 6/2004 | Scherrer | |
| 2006/0053787 | A1 | 3/2006 | Stilgenbauer | |
| 2006/0112690 | A1 | 6/2006 | Hemer | |
| 2008/0075583 | A1* | 3/2008 | Schlienger | F01D 11/00 415/159 |
| 2009/0226304 | A1* | 9/2009 | Frankenstein | F01D 11/003 415/159 |
| 2013/0089411 | A1* | 4/2013 | Ward | F01D 17/165 415/151 |
| 2013/0108483 | A1* | 5/2013 | Becker | F01D 25/166 417/313 |

\* cited by examiner

ASYMMETRIC ACTUATOR PIVOT SHAFT BUSHING FOR VTG TURBOCHARGER

CROSS-REFERENCE TO RELATED APPLICATION

This application is a national stage filing of PCT Patent Application No. PCT/US2013/073229, filed on Dec. 5, 2013, which claims priority to and all benefits of U.S. Provisional Application No. 61/746,683, filed on Dec. 28, 2012, both of which are entitled "Asymmetric Actuator Pivot Shaft Bushing For VTG Turbocharger."

BACKGROUND OF THE INVENTION

1. Field of the Invention

This invention relates to a variable turbine geometry turbocharger for an internal combustion engine. More particularly, this invention relates to an asymmetric bushing for an actuator pivot shaft.

2. Description of Related Art

A turbocharger is a type of forced induction system used with internal combustion engines. Turbochargers deliver compressed air to an engine intake, allowing more fuel to be combusted, thus boosting an engine's power density without significantly increasing engine weight. Thus, turbochargers permit the use of smaller engines that develop the same amount of power as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of reduced emissions.

Turbochargers include a turbine having a turbine housing connected to the engine's exhaust manifold, a compressor having a compressor housing connected to the engine's intake manifold, and a bearing housing connecting the turbine and compressor housings together. The turbine includes a turbine wheel disposed within the turbine housing and the compressor includes a compressor impeller disposed within the compressor housing. The turbine wheel is rotatably driven by a flow of exhaust gas supplied from the exhaust manifold. A shaft is rotatably supported in the bearing housing and couples the turbine wheel to the compressor impeller such that rotation of the turbine wheel causes rotation of the compressor impeller. The shaft connecting the turbine wheel and the compressor impeller defines a turbocharger axis of rotation. As the compressor impeller rotates, it compresses ambient air entering the compressor housing, thereby increasing the air mass flow rate, airflow density, and air pressure delivered to the engine's cylinders via the engine's intake manifold.

To improve efficiency, responsiveness, or the operating range of turbochargers, it is often advantageous to regulate the flow of exhaust gas to the turbine wheel. One method of regulating the flow of exhaust gas to the turbine wheel is commonly referred to by several names, including Variable Turbine Geometry (VTG), Variable Geometry Turbine (VGT), Variable Nozzle Turbine (VNT), or simply Variable Geometry (VG). VTG turbochargers include a plurality of adjustable guide vanes pivotally supported within a wheel inlet leading to the turbine wheel. The guide vanes are adjusted to control exhaust gas back pressure and the turbocharger speed by modulating the flow of exhaust gas to the turbine wheel.

For example, adjusting the guide vanes to constrict the flow of exhaust gas increases the velocity of the exhaust gas impacting the turbine wheel, which causes the turbine wheel to rotate more quickly. Increasing the rotation of the turbine wheel in turn increases the rotation of the compressor impeller, and thereby increases the boost pressure delivered to the engine. Conversely, adjusting the guide vanes to open the flow of exhaust gas decreases the velocity of the exhaust gas impacting the turbine wheel, which causes the turbine wheel to rotate more slowly. Decreasing the rotation of the turbine wheel in turn decreases the rotation of the compressor impeller, and thereby decreases the boost pressure delivered to the engine.

Adjusting the guide vanes also provides a means for generating and controlling exhaust gas back pressure in engines which use Exhaust Gas Recirculation (EGR) to control Nitrogen Oxide (NOx) emissions.

Referring to FIGS. 1A to 3, various elements of a typical VTG turbocharger 100 are shown. The turbocharger 100 includes a bearing housing 102 and defines a turbocharger axis of rotation R10. A vane assembly includes a plurality of guide vanes 104 mounted on vane shafts 105 between a lower vane ring 106 and an upper vane ring 108. The vane shafts 105 are rotated to adjust the position of the guide vanes 104. A vane lever or vane fork 110 is fixedly secured to an end of the vane shaft 105. The vane forks 110 engage vane blocks 114 that are rotatably coupled to a control ring 116. The guide vanes 104 are rotatably driven by the vane forks 110 in response to rotation of the control ring 116 in first and second directions about the turbocharger axis of rotation R10. The control ring 116, in turn, is rotated by an actuator pivot shaft 118.

The actuator pivot shaft 118 extends from outside the turbocharger 100 into the bearing housing 102. Attached to an inside end 120 of the actuator pivot shaft 118 is a pivot shaft fork 122. Displacement of a control linkage 124 by an actuation device (not shown) rotates a pivot arm 126 attached to the actuator pivot shaft 118 outside the bearing housing 102. The displacement of the control linkage 124 results in a rotation of the actuator pivot shaft 118 about its axis R12. This rotation of the actuator pivot shaft 118 is carried inside the bearing housing 102 and translates into rotation of the pivot shaft fork 122. The rotation of the pivot shaft fork 122 acts on an actuator block 130 that is rotatably coupled to the control ring 116, which results in rotation of the control ring 116 and corresponding adjustment of the guide vanes 104, as described above.

According to the prior art, the actuator pivot shaft 118 is supported by two bushings. A primary bushing 132 is located in a bore 134 through which the actuator pivot shaft 118 extends into the bearing housing 102. The primary bushing 132 provides radial constraint for the actuator pivot shaft 118 adjacent the pivot shaft fork 122. A secondary bushing 136 is located in a bore 138 in an outer portion of the bearing housing 102 and provides radial constraint for an outside end 140 of the actuator pivot shaft 118.

The fit between the actuator pivot shaft 118 and the primary bushing 132 allows for rotation of the actuator pivot shaft 118 without binding. Thus, when the actuation device is operated to adjust the guide vanes 104, there often are non-rotational forces that may tilt or skew the actuator pivot shaft 118. These non-rotational forces cause high contact pressure between the actuator pivot shaft 118 and the primary bushing 132, which leads to premature wear of the actuator pivot shaft 118.

It is desirable, therefore, to provide an improved bushing to prevent tilting of an actuator pivot shaft, thereby reducing contact pressure between the actuator pivot shaft and the bushing.

SUMMARY OF THE INVENTION

According to one aspect of the invention, a turbocharger includes a turbocharger housing; an actuating mechanism for actuating a device within the turbocharger housing; a pivot shaft having an inside end inside the turbocharger housing and an outside end outside the turbocharger housing, wherein the pivot shaft is rotatably mounted in a bore in the turbocharger housing for transmitting an actuating movement from outside the turbocharger housing to the actuating mechanism; and a bushing disposed in the bore, the bushing including an asymmetric portion extending inside the turbocharger housing to support the inside end of the pivot shaft.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figures 1A, 1B:
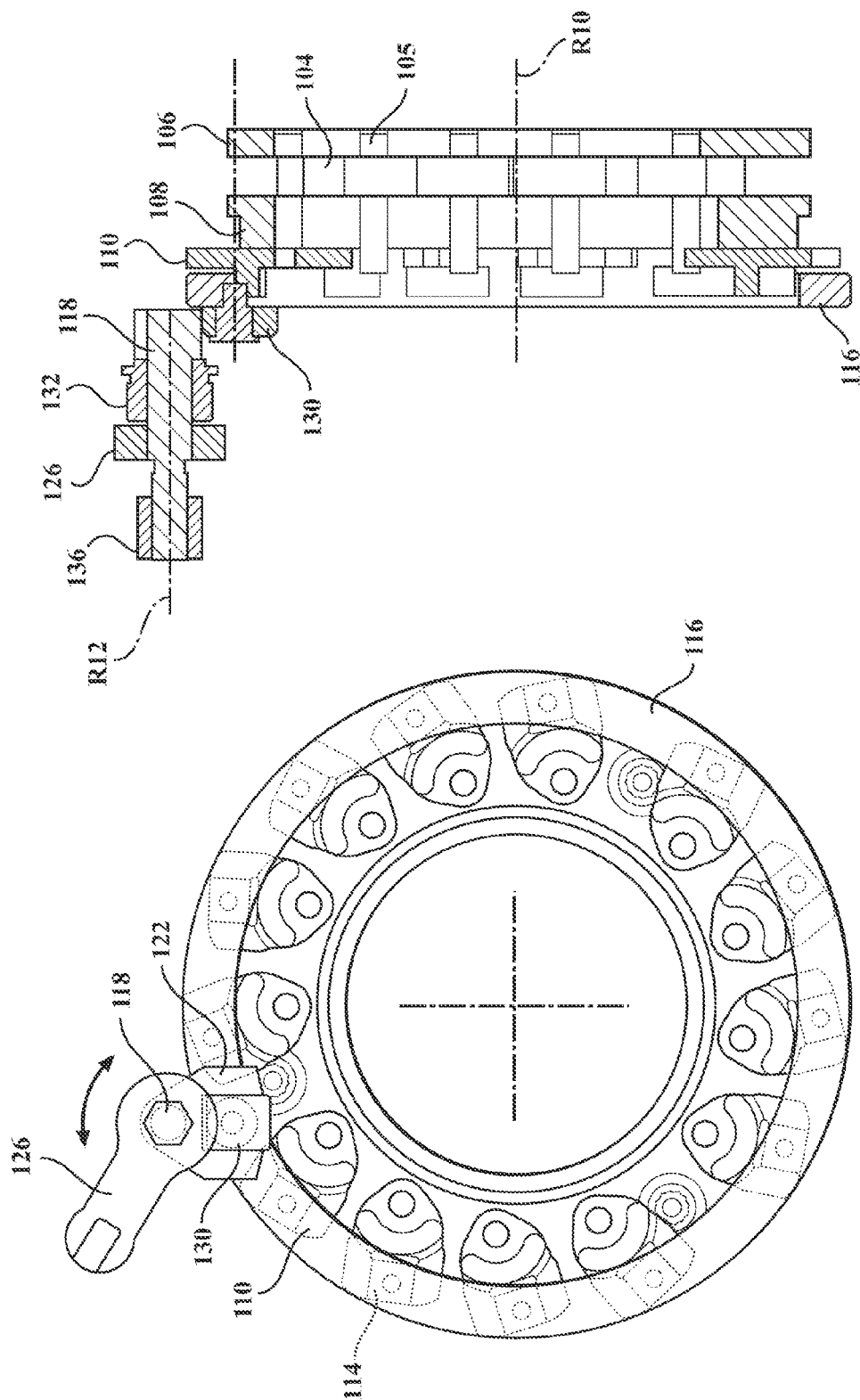
FIG. 1A is an end view of a VTG turbocharger vane assembly according to the prior art.
FIG. 1B is a cross-sectional view of the vane assembly according to the prior art.
Figure 2:
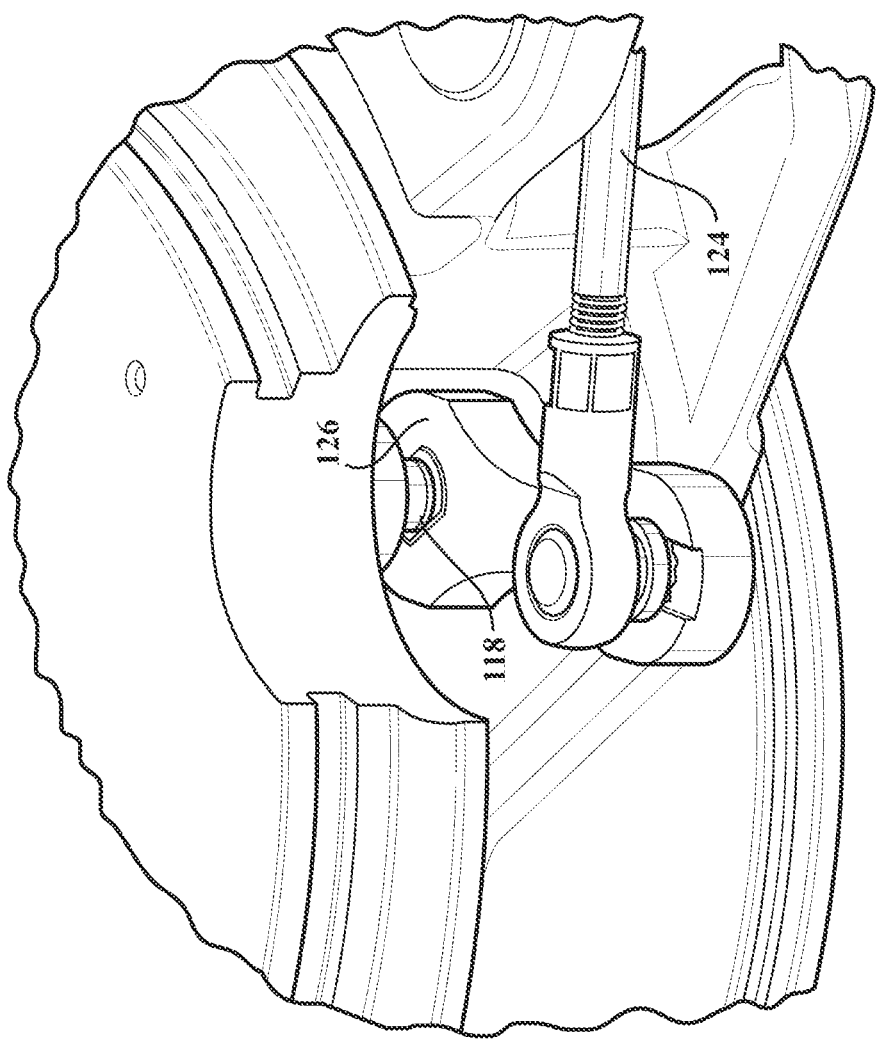
FIG. 2 is a fragmentary, perspective view of a control linkage associated with the vane assembly according to the prior art.
Figure 3:
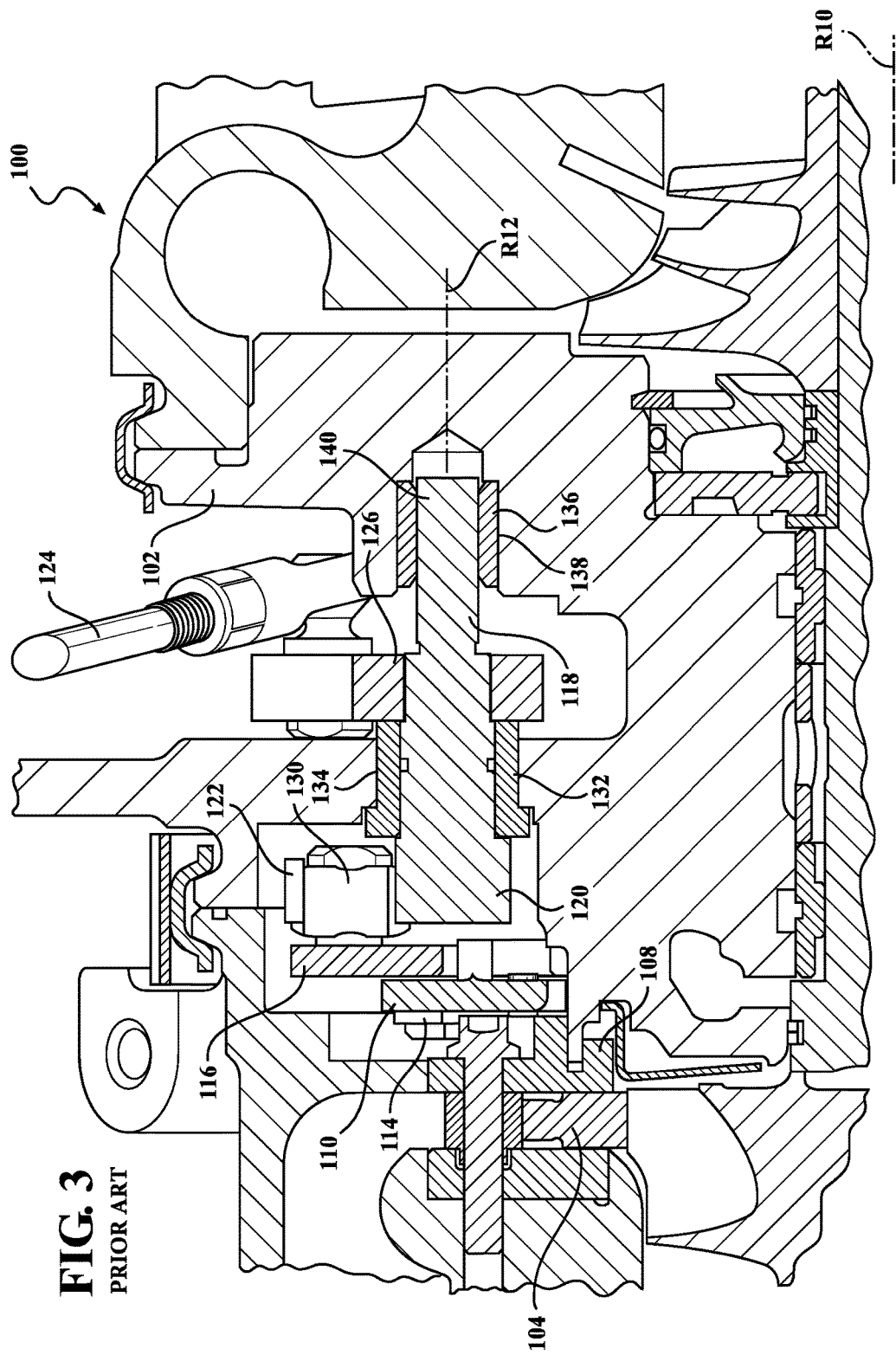
FIG. 3 is a fragmentary, cross-sectional view of a typical VTG turbocharger illustrating an actuator pivot shaft supported by a pair of bushings according to the prior art.
Figure 4:
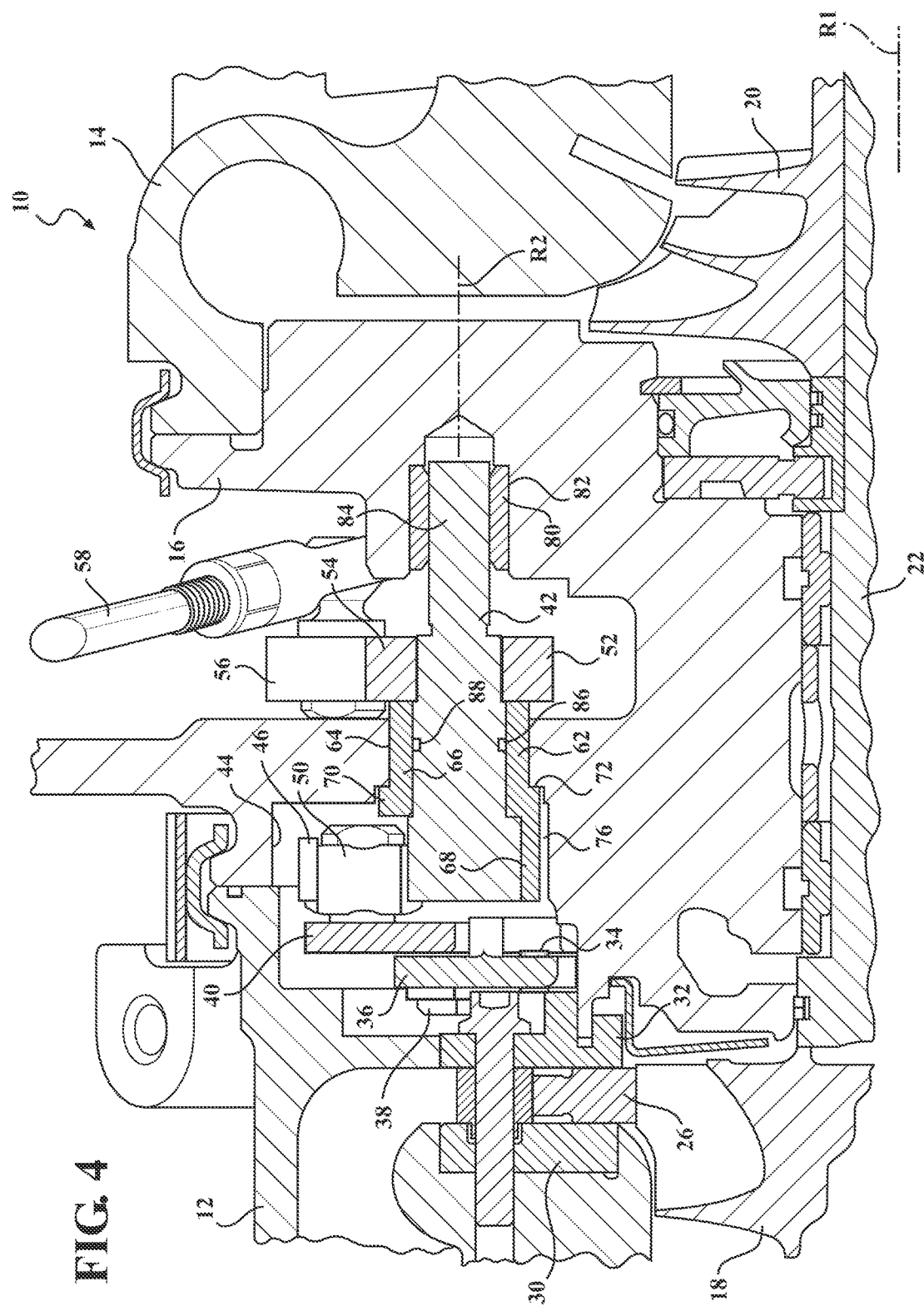
FIG. 4 is a fragmentary, cross-sectional view of a typical VTG turbocharger illustrating an actuator pivot shaft supported by an asymmetric bushing according to one embodiment of the invention.
Figure 5:
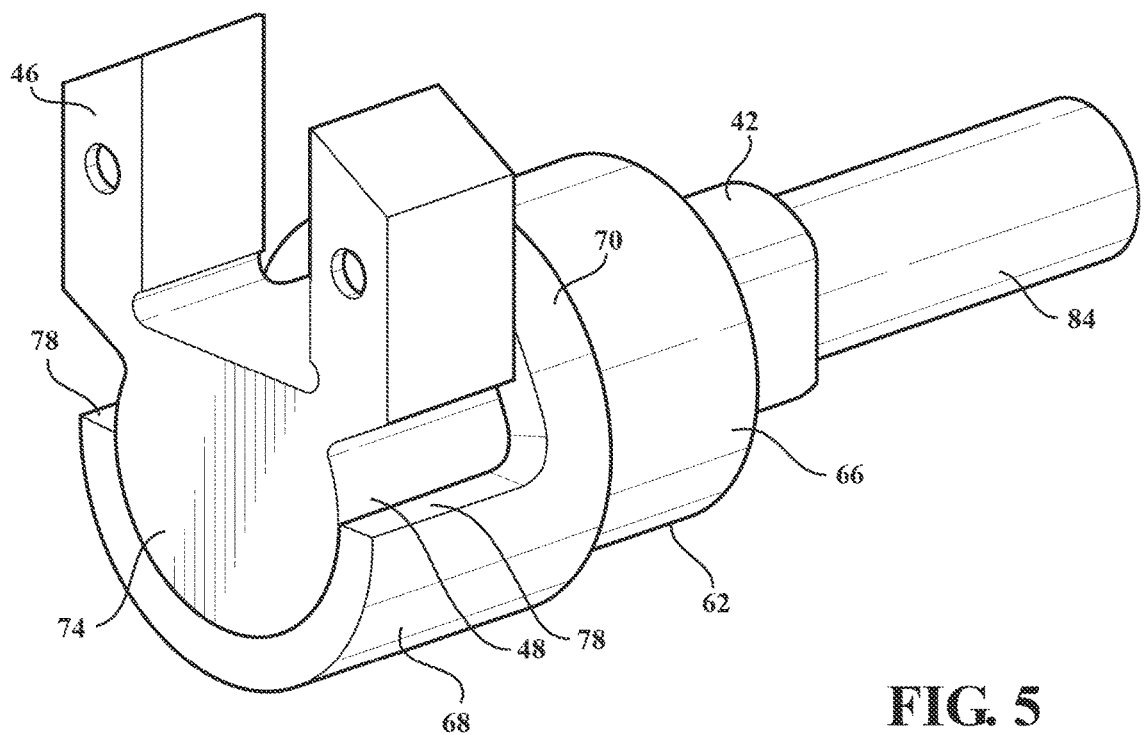
FIG. 5 is a perspective view of the actuator pivot shaft and the asymmetric bushing.

As is well known in the art, a turbocharger 10 includes a turbine having a turbine housing 12 connected to an engine exhaust manifold, a compressor having a compressor housing 14 connected to an engine intake manifold, and a bearing housing 16 connecting the turbine housing 12 and the compressor housing 14 together. A turbine wheel 18 is disposed within the turbine housing 12 and a compressor impeller 20 is disposed within the compressor housing 14. The turbine wheel 18 is rotatably driven by exhaust gas supplied from the exhaust manifold. A shaft 22 is rotatably supported in the bearing housing 16 and couples the turbine wheel 18 to the compressor impeller 20 such that rotation of the turbine wheel 18 causes rotation of the compressor impeller 20. The shaft 22 connecting the turbine wheel 18 and the compressor impeller 20 defines a turbocharger axis of rotation R1 that extends in an axial direction. As the compressor impeller 20 rotates, it compresses ambient air entering the compressor housing 14, which is then delivered to the engine's cylinders via the intake manifold.

In order to maximize the performance and efficiency of the turbocharger 10, it is common to control or regulate the exhaust gas flowing to the turbine wheel 18 using variable turbine geometry (VTG). A vane pack assembly is positioned within the turbine housing 12 to regulate the exhaust gas flowing to the turbine wheel 18.

The vane pack assembly includes a plurality of guide vanes 26 arranged circumferentially around the turbocharger axis of rotation R1 within a wheel inlet 28 leading to the turbine wheel 18. The guide vanes 26 are spaced apart in a circumferential direction and are rotatably supported between a lower vane ring 30 and an upper vane ring 32. Each guide vane 26 is mounted on a vane shaft 34 that extends in the axial direction. Rotation of the vane shaft 34 about its axis causes rotation or adjustment of the corresponding guide vane 26. Each vane shaft 34 extends through the upper vane ring 32 and includes a vane lever or vane fork 36 fixedly secured to an end of the vane shaft 34. The vane forks 36 extend generally perpendicular to the vane shafts 34 and engage vane blocks 38 that are rotatably coupled to a control ring 40. The guide vanes 26 are rotatably driven by the vane forks 36 in response to rotation of the control ring 40 in first and second directions about the turbocharger axis of rotation R1. The control ring 40, in turn, is rotated by an actuator pivot shaft 42.

The actuator pivot shaft 42 extends from outside the turbocharger 10, through the bearing housing 16, and into a bearing housing cavity 44 defined inside the bearing housing 16. An actuating mechanism or pivot shaft fork 46 is fixedly secured to an inside end 48 of the actuator pivot shaft 42. The pivot shaft fork 46 extends generally perpendicular to the actuator pivot shaft 42 and engages an actuator block 50 that is rotatably coupled to the control ring 40. A first end 52 of a pivot arm 54 is fixedly secured to the actuator pivot shaft 42 outside the bearing housing 16 and a second end 56 of the pivot arm 54 is operatively coupled to a control linkage 58. Displacement of the control linkage 58 by an actuation device (not shown) rotates the pivot arm 54, which results in a rotation of the actuator pivot shaft 42 about its axis R2. This rotation of the actuator pivot shaft 42 is carried inside the bearing housing 16 and translates into rotation of the pivot shaft fork 46. The rotation of the pivot shaft fork 46 acts on the actuator block 50, which results in rotation of the control ring 40 and corresponding adjustment of the guide vanes 26, as described above.

The actuator pivot shaft 42 is supported by two bushings. A primary bushing 62 is located in a bore 64 in the bearing housing 16 through which the actuator pivot shaft 42 extends into the bearing housing cavity 44. The primary bushing 62 provides radial constraint for the actuator pivot shaft 42 adjacent the pivot shaft fork 46. The primary bushing 62 includes a first portion 66, a second portion 68, and a collar 70 disposed between the first portion 66 and the second portion 68. The first portion 66 is cylindrical and is press-fit or otherwise disposed within the bore 64 in the bearing housing 16. An outer circumference of the collar 70 has a diameter that is larger than a diameter of an outer circumference of the first portion 66. The collar 70 abuts a recessed shoulder 72 on an inner side of the bearing housing 16 to position the primary bushing 62 in the axial direction. The second portion 68 is semi-cylindrical and extends in the axial direction from the collar 70 into the bearing housing cavity 44 and is generally flush with an end surface 74 of the inside end 48 of the actuator pivot shaft 42. In the present embodiment, there is a gap 76 in a radial direction between an outer surface of the second portion 68 and the bearing housing 16 such that the second portion 68 extends into the bearing housing cavity 44 in a cantilevered fashion. The second portion 68 is asymmetric in that it partially encircles the actuator pivot shaft 42. In contrast, the first portion 66 is symmetric in that it fully encircles the actuator pivot shaft 42. There is clearance in the circumferential direction between edges 78 of the second portion 68 and sides of the pivot shaft fork 46 to allow the actuator pivot shaft 42 to rotate relative to the primary bushing 62 without the pivot shaft fork 46 binding against the edges 78 of the second portion 68. The second portion 68 is in direct contact with and supports the inside end 48 of the actuator pivot shaft 42. As such, the second portion 68 prevents non-rotational forces acting on the actuator pivot shaft 42 from tilting or skewing the actuator pivot shaft 42 in the primary bushing 62.

It is contemplated that in an alternative embodiment, the outer surface of the second portion 68 may be in contact with the bearing housing 16 without varying from the scope of the invention.

A secondary bushing 80 is located in a bore 82 in an outer portion of the bearing housing 16 and provides radial constraint for an outside end 84 of the actuator pivot shaft 42.

A piston ring 86 is located in a groove 88 extending around an outer circumference of the actuator pivot shaft 42. The piston ring 86 seals against an inner bore of the primary bushing 62 to prevent gases and oil from leaking out of the bearing housing 16.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A turbocharger (10) comprising:
a turbocharger housing (12, 14, 16);
an actuating mechanism (46) for actuating a device (40) within said turbocharger housing (12, 14, 16);
a pivot shaft (42) having an inside end (48) inside said turbocharger housing (12, 14, 16) and an outside end (82) outside said turbocharger housing (12, 14, 16), wherein said pivot shaft (42) is rotatably mounted in a bore (64) in said turbocharger housing (12, 14, 16) for transmitting an actuating movement from outside said turbocharger housing (12, 14, 16) to said actuating mechanism (46); and
a bushing (62) disposed in said bore (64), said bushing (62) including an asymmetric portion (68) extending inside said turbocharger housing (12, 14, 16) to support said inside end (48) of said pivot shaft (42).

2. The turbocharger (10) as set forth in claim 1 wherein said asymmetric portion (68) is semi-cylindrical, and wherein clearance is provided in a circumferential direction between edges (78) of said asymmetric portion (68) and said actuating mechanism (46) to allow rotation of said pivot shaft (42) relative to said bushing (62).

3. The turbocharger (10) as set forth in claim 2 wherein said bushing (62) includes a first portion (66) that is disposed in said bore (64), said first portion (66) completely encircles said pivot shaft (42) and said asymmetric portion (68) partially encircles said pivot shaft (42).

4. The turbocharger (10) as set forth in claim 3 wherein said bushing (62) includes a collar (70) disposed between said first portion (66) and said asymmetric portion (68), wherein said collar (70) includes an outer circumference having a diameter that is larger than a diameter of an outer circumference of said first portion (66).

5. The turbocharger (10) as set forth in claim 4 wherein said collar (70) abuts a recessed shoulder (72) inside said turbocharger housing (12, 14, 16) to position said bushing (62) in an axial direction.

6. The turbocharger (10) as set forth in claim 5 wherein said asymmetric portion (68) is generally flush with an end surface (74) of said inside end (48) of said pivot shaft (42).

7. The turbocharger (10) as set forth in claim 6 including a gap (76) extending in a radial direction between said asymmetric portion (68) and said turbocharger housing (12, 14, 16) such that said asymmetric portion (68) extends inside said turbocharger housing (12, 14, 16) in a cantilevered fashion.

8. A turbocharger (10) comprising:
a turbocharger housing (12, 14, 16) having a bore (64);
a plurality of guide vanes (26) disposed inside said turbocharger housing (12, 14, 16);
a control ring (40) operatively coupled to said plurality of guide vanes (26);
an actuator pivot shaft (42) having an inside end (48) with a pivot shaft fork (46) inside said turbocharger housing (12, 14, 16) and an outside end (82) outside said turbocharger housing (12, 14, 16), wherein said pivot shaft fork (46) is operatively coupled to said control ring (40) for actuating said control ring (40), and wherein said actuator pivot shaft (42) is rotatably mounted in said bore (64) for transmitting an actuating movement from outside said turbocharger housing (12, 14, 16) to said pivot shaft fork (46); and
a bushing (62) disposed in said bore (64), said bushing (62) including an asymmetric portion (68) extending inside said turbocharger housing (12, 14, 16) to support said inside end (48) of said actuator pivot shaft (42).

9. The turbocharger (10) as set forth in claim 8 wherein said asymmetric portion (68) is semi-cylindrical, and wherein clearance is provided in a circumferential direction between edges (78) of said asymmetric portion (68) and said pivot shaft fork (46) to allow rotation of said actuator pivot shaft (42) relative to said bushing (62).

10. The turbocharger (10) as set forth in claim 9 wherein said bushing (62) includes a first portion (66) that is disposed in said bore (64), said first portion (66) completely encircles said actuator pivot shaft (42) and said asymmetric portion (68) partially encircles said actuator pivot shaft (42).

11. The turbocharger (10) as set forth in claim 10 wherein said bushing (62) includes a collar (70) disposed between said first portion (66) and said asymmetric portion (68), wherein said collar (70) includes an outer circumference having a diameter that is larger than a diameter of an outer circumference of said first portion (66).

12. The turbocharger (10) as set forth in claim 11 wherein said collar (70) abuts a recessed shoulder (72) inside said turbocharger housing (12, 14, 16) to position said bushing (62) in an axial direction.

13. The turbocharger (10) as set forth in claim 12 wherein said asymmetric portion (68) is generally flush with an end surface (74) of said inside end (48) of said actuator pivot shaft (42).

14. The turbocharger (10) as set forth in claim 13 including a gap (76) extending in a radial direction between said asymmetric portion (68) and said turbocharger housing (12, 14, 16) such that said asymmetric portion (68) extends inside said turbocharger housing (12, 14, 16) in a cantilevered fashion.

15. A turbocharger (10) comprising:
a bearing housing (16) having a bore (64), said bearing housing (16) defining a bearing housing cavity (44);
a plurality of guide vanes (26) disposed inside said turbocharger (10);
an actuator pivot shaft (42) having an inside end (48) with a pivot shaft fork (46) disposed inside said bearing housing cavity (44) and an outside end (82) disposed outside said bearing housing cavity (44), wherein said pivot shaft fork (46) is operatively coupled to said plurality of guide vanes (26) for actuating said plurality of guide vanes (26), and wherein said actuator pivot shaft (42) is rotatably mounted in said bore (64) for transmitting an actuating movement from outside said bearing housing (16) to said pivot shaft fork (46); and
a bushing (62) disposed in said bore (64), said bushing (62) including an asymmetric portion (68) extending into said bearing housing cavity (44) to support said inside end (48) of said actuator pivot shaft (42).

\* \* \* \* \*